US009234581B2

United States Patent
Nagahori et al.

(10) Patent No.: US 9,234,581 B2
(45) Date of Patent: Jan. 12, 2016

(54) RANGE SWITCHING DEVICE

(71) Applicant: Mitsubishi Electric Corporation, Chiyoda-ku, Tokyo (JP)

(72) Inventors: Tatsuro Nagahori, Chiyoda-ku (JP); Takuya Uryu, Chiyoda-ku (JP); Kazuhisa Kurita, Chiyoda-ku (JP); Chiaki Sugano, Chiyoda-ku (JP); Naruhiko Kawasaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 14/449,815

(22) Filed: Aug. 1, 2014

(65) Prior Publication Data
US 2015/0285373 A1 Oct. 8, 2015

(30) Foreign Application Priority Data

Apr. 7, 2014 (JP) ................................. 2014-078410

(51) Int. Cl.
*F16H 48/06* (2006.01)
*F16H 61/32* (2006.01)
*F16H 61/00* (2006.01)
*F16H 61/28* (2006.01)

(52) U.S. Cl.
CPC ............ *F16H 61/32* (2013.01); *F16H 61/0006* (2013.01); *F16H 2061/2892* (2013.01); *F16H 2061/326* (2013.01)

(58) Field of Classification Search
CPC ................ F16H 61/32; F16H 61/0006; F16H 2061/2892; F16H 2061/326
See application file for complete search history.

(56) References Cited

U.S. PATENT DOCUMENTS

| 2002/0007691 | A1  | 1/2002 | Peter |
|---|---|---|---|
| 2003/0146672 | A1  | 8/2003 | Fukushima et al. |
| 2005/0215375 | A1* | 9/2005 | Kimura ..................... F16H 1/32 475/149 |
| 2006/0163025 | A1* | 7/2006 | Hori ........................ F16H 61/24 192/219.5 |
| 2006/0201768 | A1* | 9/2006 | Hori ...................... F02N 11/103 192/84.1 |
| 2007/0044583 | A1* | 3/2007 | Hori ........................ F16H 61/32 74/335 |
| 2007/0046243 | A1* | 3/2007 | Hori ........................ F16H 61/32 318/630 |

(Continued)

FOREIGN PATENT DOCUMENTS

| JP | 11275835 A | 10/1999 |
|---|---|---|
| JP | 200271020 A | 3/2002 |

(Continued)

OTHER PUBLICATIONS

Communication dated Mar. 31, 2015, issued by the Japanese Patent Office in counterpart Application No. 2014078410.

*Primary Examiner* — David J Hlavka
(74) *Attorney, Agent, or Firm* — Sughrue Mion, PLLC; Richard C. Turner

(57) ABSTRACT

A range switching device includes: a range switching portion having an output shaft rotatably supported inside a housing and switchable to ranges corresponding to output shaft turning positions; a motor attached with its motor shaft spaced apart from a shaft center of the output shaft; a reducer mechanism linked to the motor and the range switching portion; and a control board controlling rotation of the motor. The reducer mechanism has a planetary gear reducer mechanism formed of a sun gear, planetary gears, an internal gear, and a carrier supporting the planetary gears, and a spur gear reducer mechanism formed of a pinion and a main gear linked to the pinion. The control board is installed oppositely to the output shaft and the motor.

7 Claims, 5 Drawing Sheets

(56) References Cited

U.S. PATENT DOCUMENTS

| | | | | |
|---|---|---|---|---|
| 2007/0129199 | A1* | 6/2007 | Tanaka | F16H 61/32 475/204 |
| 2009/0241713 | A1* | 10/2009 | Ito | F16D 1/06 74/473.1 |
| 2010/0170355 | A1* | 7/2010 | Kume | F16H 61/32 74/63 |
| 2011/0293450 | A1 | 12/2011 | Grimes et al. | |

FOREIGN PATENT DOCUMENTS

| | | |
|---|---|---|
| JP | 2007221978 A | 8/2007 |
| JP | 2010136587 A | 6/2010 |
| JP | 2012-219871 A | 11/2012 |
| JP | 2013530669 A | 7/2013 |

* cited by examiner

RANGE SWITCHING DEVICE

BACKGROUND OF THE INVENTION

1. Field of the Invention

The present invention relates to a range switching device including so-called a shift-by-wire system that sets a shift range selected by a driver using, for example, a shift lever, via an electrical signal.

2. Description of the Background Art

There is a range switching device including a motor, a cycloidal reducer portion, a parallel-shaft gear reducer portion, and an output shaft inside an outer-frame member as disclosed, for example, in Patent Literature 1.

The range switching device disclosed in Patent Literature 1 is configured as follows. That is, an electronic control unit is installed on the outside of the outer-frame member and a housing main body of the range switching device is provided with a connector protruding radially outward. The range switching device and the electronic control unit are electrically connected to each other by coupling a connector storing wirings from the electronic control unit to the connector of the housing main body.

[Patent Literature 1] JP-A-2012-219871

According to the range switching device disclosed in Patent Literature 1, a wiring member from a motor and an encoder is insert-molded in the housing main body of the range switching device and the wiring member extends into the connector by passing an interior of the housing main body. This configuration, however, raises a problem that not only an extremely long wiring member to connect the motor and the encoder all the way to the connector is required, but also a layout of the wiring member and respective components inside the housing becomes highly complex.

Also, the range switching device and the electronic control unit controlling the driving of the range switching device are present separately. This configuration raises another problem that restrictions imposed on the layout around a transmission become stricter to the extent that attachment becomes difficult.

Further, a cycloidal reducer is used to increase a torque generated by the motor to as high a torque as required for shift range switching. Accordingly, an extremely high degree of accuracy is required for components and during assembly and such a requirement raises still another problem that manufacturing during component fabrication and assembly becomes extremely difficult.

SUMMARY OF THE INVENTION

The invention was devised to solve the problems discussed above and has an object to provide a range switching device not only capable of suppressing an increase in complexity of a layout of respective components inside the range switching device, but also capable of facilitating attachment around a transmission.

The invention has another object to provide a range switching device capable of increasing a torque to as high a torque as required for shift range switching using an extremely simple configuration without requiring a high degree of accuracy for respective components and during assembly.

A range switching device according to one aspect of the invention includes: a range switching portion having an output shaft supported in a rotatable manner inside a housing formed of a front body and a rear body and switchable to a plurality of ranges corresponding to turning positions of the output shaft; a motor attached inside the housing, a motor shaft of which is spaced apart from a shaft center of the output shaft; a reducer mechanism linked to the motor and the output shaft; and a control board attached inside the housing and controlling rotation of the motor. The reducer mechanism has a planetary gear reducer mechanism and a spur gear reducer mechanism. The planetary gear reducer mechanism is formed of a sun gear coupled to the motor shaft, a plurality of planetary gears meshed with the sun gear and installed equally on a circumference, an internal gear meshed with the planetary gears, and a carrier supporting the planetary gears in rotatable and revolvable manners. The spur gear reducer mechanism is formed of a pinion coupled to the carrier on an opposite side to the planetary gears and a main gear fixed to the output shaft of the range switching portion and linked to the pinion. The control board is installed oppositely to the output shaft and the motor.

According to the configuration as above, the control board controlling the driving of the range switching device opposes the output shaft and the motor. Hence, a long wiring member to connect a motor and an encoder all the way to a connector becomes unnecessary, and only a short wiring member to connect the control board and the connector is sufficient as the wiring member. The range switching device can be therefore formed without requiring a complex layout of the wiring member, which can in turn suppress an increase in complexity of a layout of the respective components forming the range switching device. Also, the control board is installed integrally inside the housing of the range switching device. This configuration eliminates the need to provide an electronic control unit on the outside. Hence, not only can the overall device be more compact, but also attachment around a transmission can be readily achieved.

In addition, by forming the reducer mechanism using the simple planetary gear reducer mechanism and the simple spur gear reducer mechanism, a high reduction ratio can be obtained without requiring a high degree of accuracy for the respective components and during assembly.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
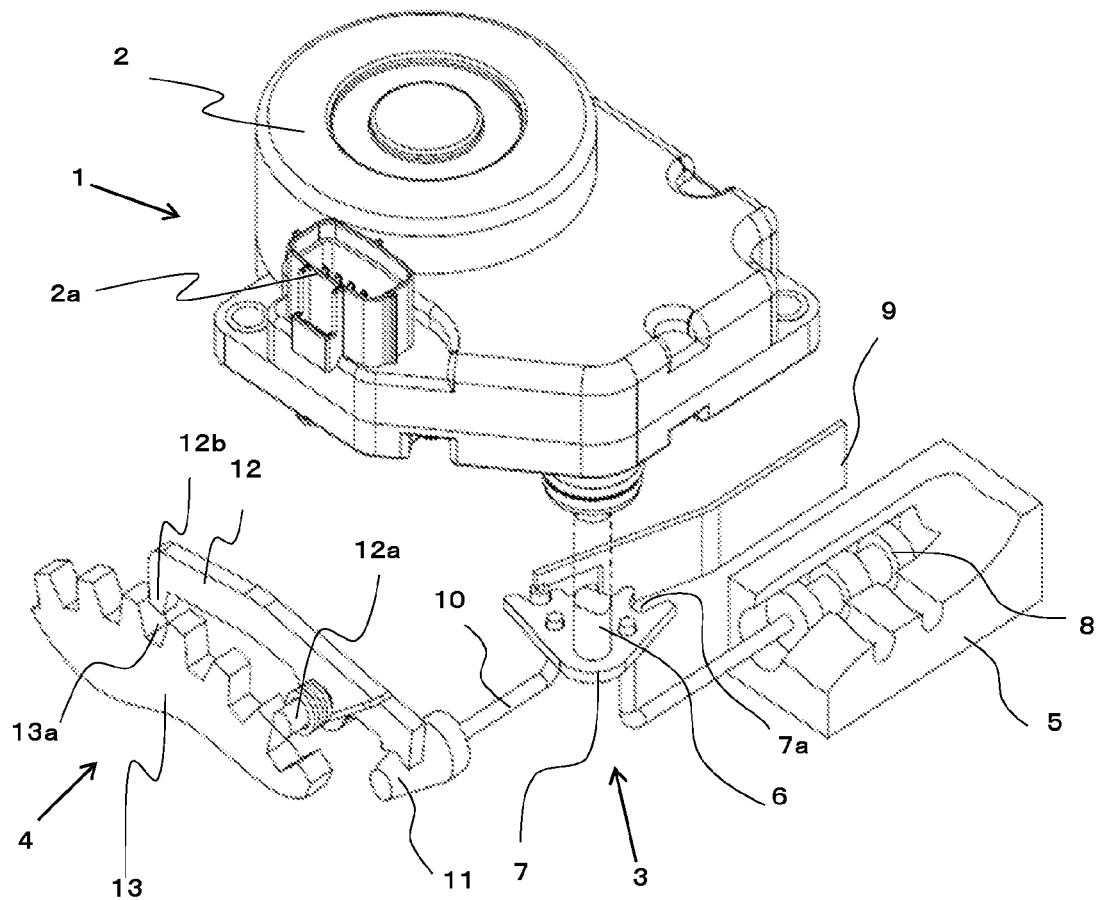
FIG. 1 is a perspective view schematically showing a range switching device of the invention and peripheral mechanisms.

Hereinafter, the invention will be described with reference to FIG. 1 through FIG. 6 showing a first embodiment.

Same reference numerals denote same or equivalent portions in the respective drawings.

FIG. 1 schematically shows a range switching mechanism 1 to which a range switching device according to the first embodiment of the invention is applied. The range switching mechanism 1 is formed of a range switching device 2 which is a major portion of the invention, a detent mechanism 3, a parking mechanism 4, and a valve body 5.

The range switching device 2 is formed so as to be attached to an automatic transmission mounted, for example, on a vehicle, and includes a connector 2a to which is supplied a shift signal (electrical signal) from a shift lever (range selection portion) selected by a driver. According to this shift signal, the range switching device 2 rotationally drives a shift shaft 6, which is a drive target linked to its own output shaft, and thereby turns a detent plate 7 of substantially a fan shape attached to the shift shaft 6. A spool valve 8 is engaged with the detent plate 7. It is configured in such a manner that when the detent plate 7 turns in association with turning motion of the shift shaft 6, the engaged spool 8 reciprocates within the valve body 5 and predetermined shift ranges (P, R, N, and D) are set by switching oil paths in the valve body 5 with the reciprocal motion.

The detent plate 7 is provided with a plurality of concave portions 7a at tip end of the substantially fan shape. The concave portions 7a correspond to the respective range positions (P, R, N and D) of the spool valve 8.

Further, a detent spring 9 fixed to the valve body 5 acts as a blade spring. It is configured in such a manner that the detent plate 7 is positioned and held by pressing a tip end of the detent spring 9 against one of the concave portions 7a.

On the other hand, the parking mechanism 4 has a parking rod 10 linked to the detent plate 7, a conical portion 11 provided at a tip end of the parking rod 10, a parking pawl 12, and a parking gear 13. The parking rod 10 undergoes displacement in association with turning motion of the detent plate 7. The parking rod 10 thus allows the parking pawl 12 to swing upward or downward about a shaft 12a via the conical portion 11 provided at the tip end. A convex portion 12b of the parking pawl 12 fits in a concave portion 13a of the parking gear 13 or comes off from the concave portion 13a in association with the swinging motion, in response to which the parking mechanism 4 is locked or unlocked. An output member in the transmission is thus allowed to rotate or prevented from rotating.

As has been described, because the shift shaft 6 and the spool valve 8 are interlocked via the detent plate 7, the range switching mechanism 1 can set a predetermined shift range by controlling a rotational angle of the shift shaft 6 and thereby controlling the position of the spool valve 8.

The range switching device 2 which is a major portion of the invention will now be described in detail with reference to FIG. 2 through FIG. 5.

Figure 2:
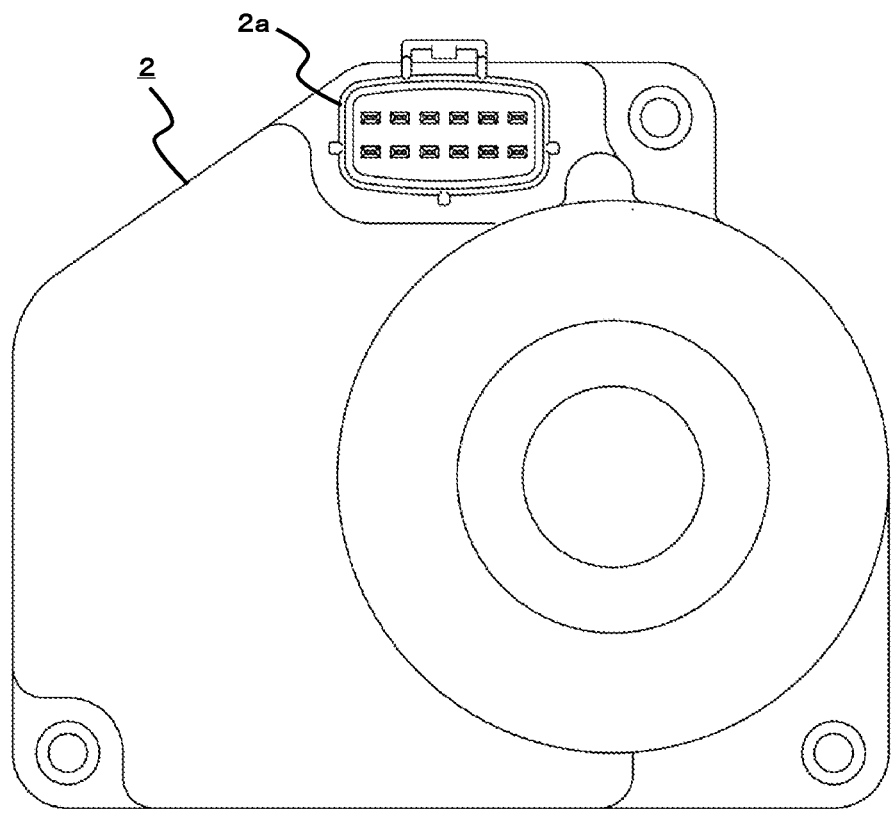
FIG. 2 is a plan view showing an outward appearance of a range switching device according to a first embodiment of the invention.
Figure 3:
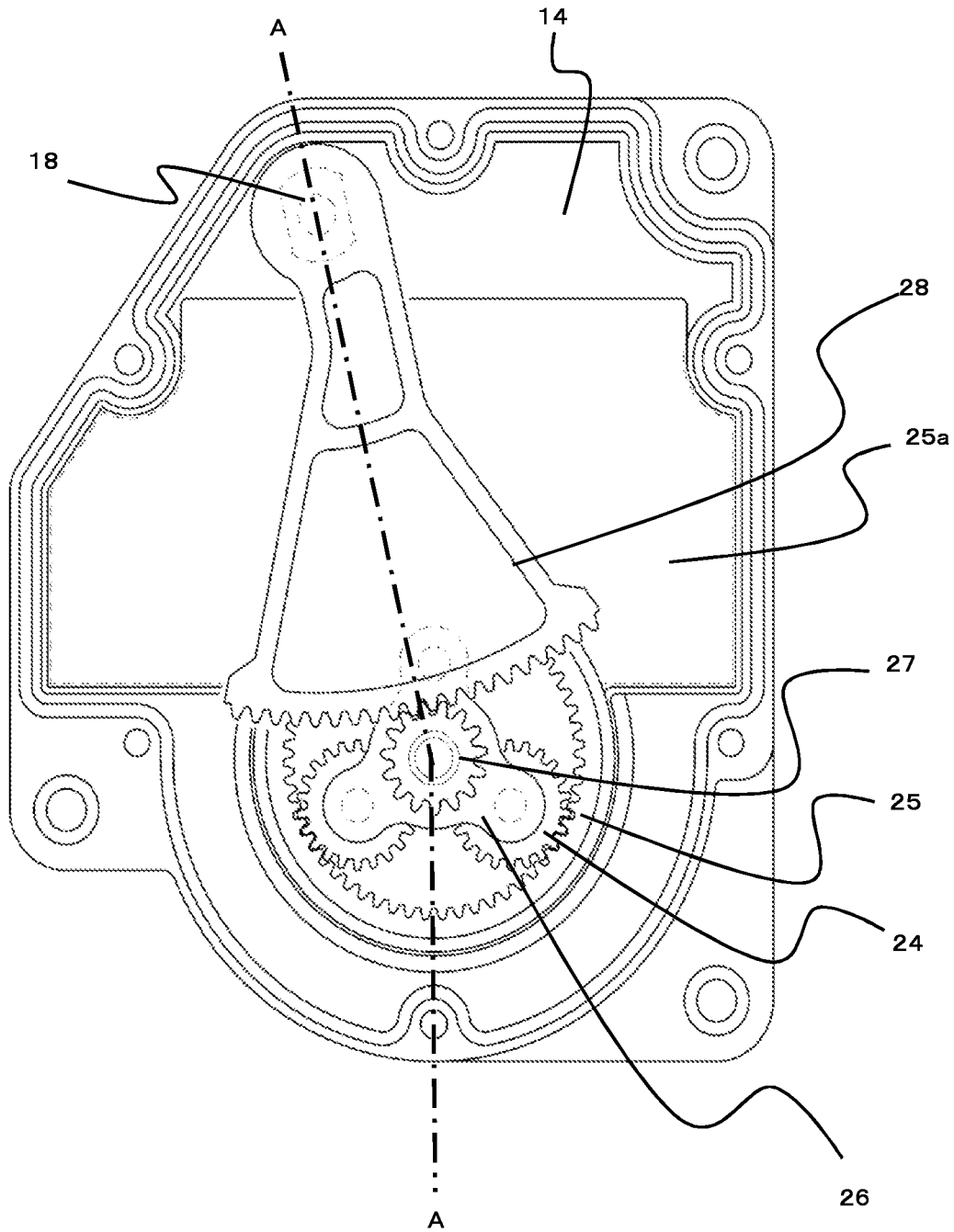
FIG. 3 is a plan view in partial cross-section of the range switching device according to the first embodiment of the invention.
Figure 4:
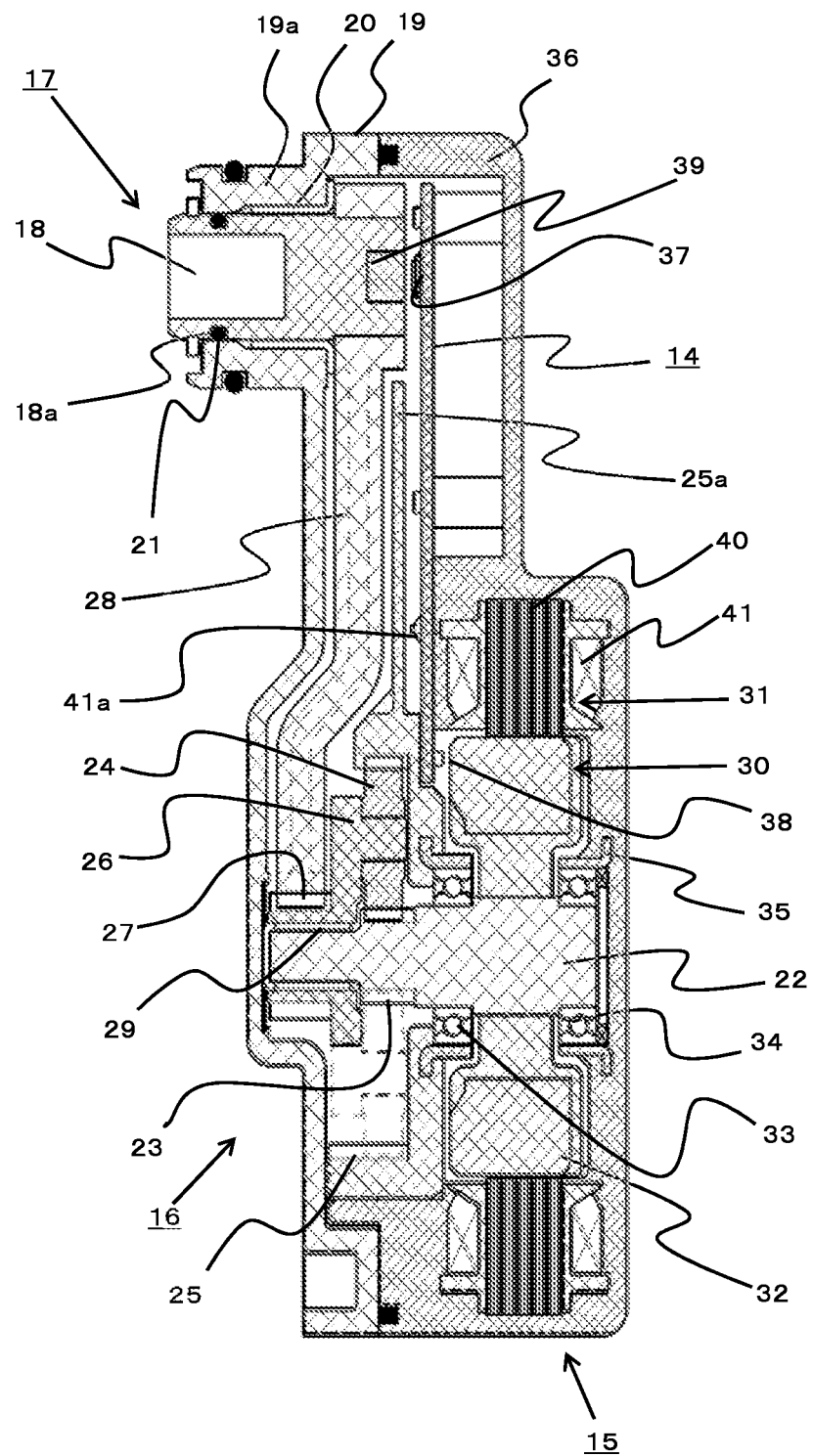
FIG. 4 is a cross section of a major portion taken along the line A-A of FIG. 3.
Figure 5:
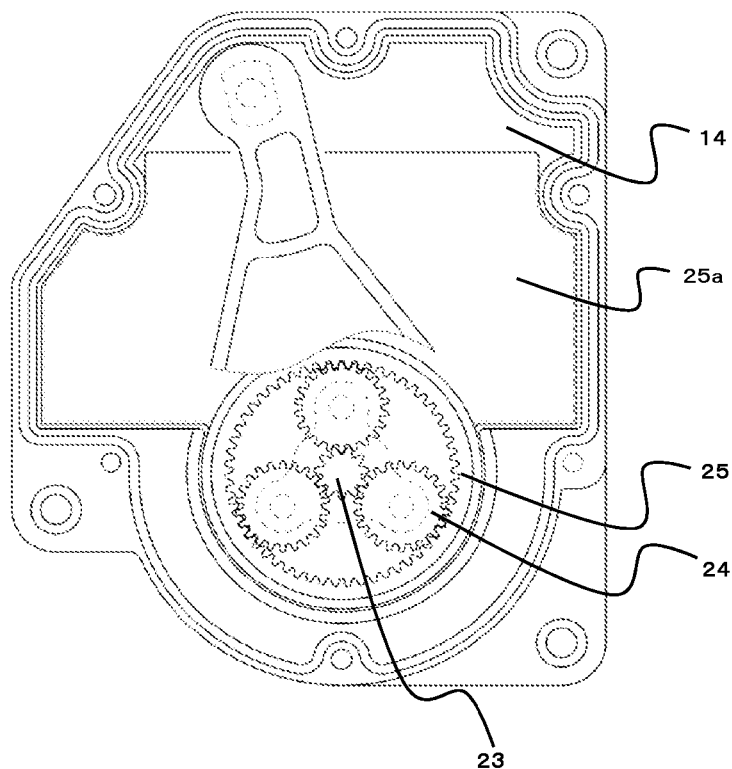
FIG. 5 is a view schematically showing a configuration of a planetary gear reducer mechanism in the range switching device according to the first embodiment of the invention.

FIG. 2 is a plan view showing an outward appearance of the range switching device 2 according to the first embodiment of the invention. FIG. 3 is a plan view in partial cross-section of the range switching device 2 according to the first embodiment of the invention. FIG. 4 is a cross section taken along the line A-A of FIG. 3. FIG. 5 is a view schematically showing a configuration of a planetary gear reducer mechanism in the range switching device 2 according to the first embodiment of the invention.

Referring to the drawings, the range switching device 2 includes a control board 14 into which the electrical control unit made to generate a control signal based on the shift signal from a shift lever, a motor 15 controlled according to the control signal from the control board 14, a reducer mechanism 16 linked to the motor 15, and a range switching portion 17 that switches the shift ranges by rotating the shift shaft 6 linked to the reducer mechanism 16.

An output shaft 18 of the range switching portion 17 is supported in a rotatable manner on a supporting tube portion 19a of a front body 19 forming a housing of the range switching device 2 via a metal bearing 20 provided on an inner side of the supporting tube portion 19a. A concave portion 18a is provided to the output shaft 18 along an outer peripheral portion on a front side. Air tightness or liquid tightness between the interior and the exterior is maintained by a seal member 21 pinched between the concave portion 18a and the front body 19.

On the other hand, the reducer mechanism 16 is formed of a planetary gear reducer mechanism and a spur gear reducer mechanism and has a sun gear 23 press-fit and fixed to a rotating motor shaft 22, planetary gears 24 meshed with the sun gear 23, an internal gear 25 meshed with the planetary gears 24, a carrier 26 supporting the planetary gears 24 in rotatable and revolvable manners, a pinion 27 formed integrally with the carrier 26 on an opposite side to the planetary gears 24, and a main gear 28 fixed to the output shaft 18 and meshed with the pinion 27.

The carrier 26 formed integrally with the pinion 27 is supported on the motor shaft 22 via a metal bearing 29 provided along the outer periphery of the motor shaft 22 extending toward the planetary gears 24 in such a manner that the carrier 26 is allowed to rotate while coming into sliding contact with the motor shaft 22. The internal gear 25 is made of resin, and as is shown in FIG. 5, has a dust-proof wall 25a molded integrally with the internal gear 25 halfway along the periphery, the opposite side of which extends toward the output shaft 18 of the range switching portion 17. The dust-proof wall 25a is located so as to separate the reducer mechanism 16 and the control board 14.

The motor 15 is a brushless motor using a permanent magnet and formed of a rotor 30 supported in a rotatable manner and a stator 31 coaxially mounted on a rotation center of the rotor 30.

The rotor 30 is formed by integrally molding a motor shaft 22 and a magnet 32. The motor shaft 22 is supported on a rear body 36 in a rotatable manner by a first rolling bearing 33 and a second rolling bearing 34. The stator 31 is formed by being integrally molded with the rear body 36 together with a plate 35. The rear body 36 and the front body 19 together form the housing of the range switching device 2. A shaft center of the output shaft 18 of the range switching portion 17 and a shaft center of the motor shaft 22 are located apart from each other, so that the pinion 27 and the main gear 28 can be installed.

The control board 14 is fixed to the rear body 36 in such a manner that one end is located oppositely to the output shaft 18 of the range switching portion 17 and the other end is positioned oppositely to the rotor 30 of the motor 15. A range switching position detection sensor 37 that detects a rotational angle of the output shaft 18 is attached to the control board 14 at a position at which this sensor opposes the output shaft 18, and a motor position detection sensor 38 that detects a rotation position of the rotor 30 is attached to the control board 14 at a position at which this sensor opposes the rotor 30.

More specifically, the range switching position detection sensor 37 is installed on the control board 14 on an extension of the axis of the output shaft 18 at the position at which this sensor opposes a magnet 39 embedded in the output shaft 18, and formed of a magnetic sensor of a magnetic flux azimuth detection type. Hence, the range switching position detection sensor 37 detects a rotation position by a change of magnetic flux of the magnet 39 associated with rotation of the output shaft 18.

On the other hand, the motor position detection sensor 38 is formed of a non-contact hall sensor installed on the control board 14 at a position at which this sensor opposes the rotor 30. By performing control by detecting a field generated by the magnet 32 of the rotor 30, the motor 15 is allowed to undergo rotational motion without a step-out. An axial dimension of the magnet 32 is greater than an axial dimension of the stator 31 and the magnet 32 is installed so as to protrude toward the motor position detection sensor 38.

Figure 6:
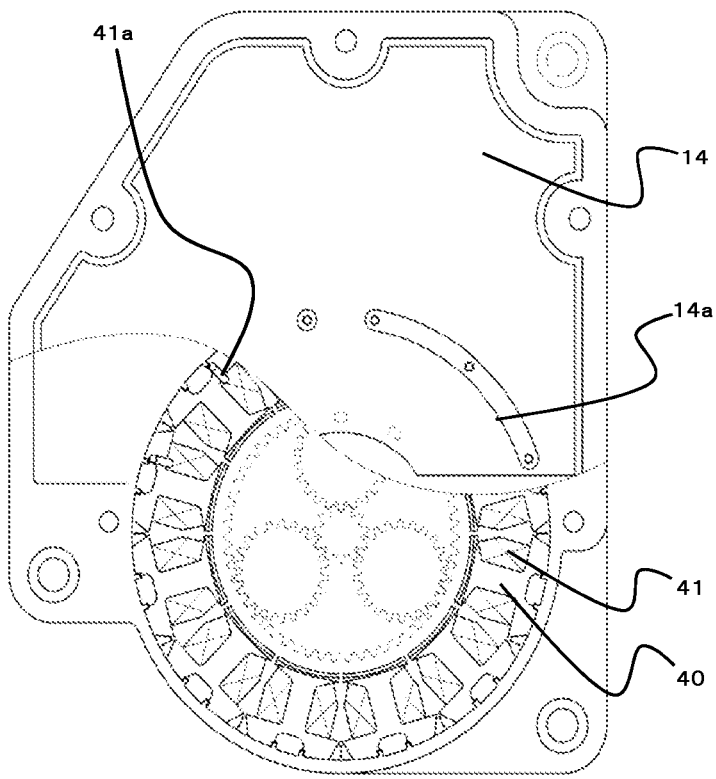
FIG. 6 is a view schematically showing a connection state of a motor in the range switching device according to the first embodiment of the invention.

The stator 31 fixed to the rear body 36 is formed of a stator core 40 and a coil 41. The stator core 40 forms a plurality of stator teeth protruding radially inward at every 30 degrees in a circumferential direction. The coil 41 is formed of U-phase, V-phase, and W-phase coils wound around the respective stator teeth in a three-phase star connection configuration. As are shown in FIG. 4 and FIG. 6, both ends of the respective phases of the coil 41 extend axially at positions at which each end overlaps the control board 14 in the circumferential direction of the stator core 40. Each coil end 41a is electrically and mechanically connected directly onto the control board 14 by soldering or the like. A neutral point of the star connection is formed of a board pattern 14a on the board 14.

In the range switching device 2 of the first embodiment configured as above, a torque generated by the motor 15 is reduced by the sun gear 23, the planetary gears 24, the internal gear 25, and the carrier 26 and transmitted to the pinion 27. The torque transmitted to the pinion 27 is reduced by the main gear 28 meshed with the pinion 27 and transmitted to the output shaft 18.

It should be noted that the control board 14 opposes the output shaft 18 and the motor 15. The control board 14 is thus located at a position sandwiched between the front body 19 and the rear body 36 and consequently protected by the front body 19 and the rear body 36. Hence, because the need to provide a new outer wall protecting the control board 14 is eliminated, the number of components can be reduced.

Further, besides opposing the output shaft 18 and the motor 15, the control board 14 is installed integrally inside the range switching device 2 and has the range switching position detection sensor 37 and the motor position detection sensor 38 on-board. Moreover, the both ends of the respective phases of the coil 41 are directly connected to the control board 14. Hence, only a short wiring member to connect a control board and a connector is sufficient as a wiring member. The range switching device 2 can be therefore formed without requiring a complex layout for the wiring member and an increase in complexity of the layout of the respective components forming the range switching device 2 can be suppressed.

Also, it is no longer necessary to provide an electronic control unit on the outside by building into a control board the electrical control unit which controls rotation of the motor 15 etc. Hence, not only can the overall device be more compact, but also attachment around the transmission can be readily achieved.

Further, by forming the reducer mechanism 16 using the simple planetary gear reducer mechanism and the simple spur gear reducer mechanism, it becomes possible to obtain the range switching device 2 capable of obtaining a high reduction ratio without requiring a high degree of accuracy for the respective components and during assembly.

Also, as is shown in FIG. 5, the planetary gears 24 include three planetary gears equally spaced apart by 120 degrees on the circumference. Hence, the number of teeth of the sun gear 23 and the planetary gears 24 meshed with each other is three times greater than in a case where only one planetary gear is used, and therefore a load applied to a single tooth can be lessened. Accordingly, because the strength of the gears can be lowered, the device can be more compact and flatter by reducing a teeth width. Further, by installing the planetary gears 24 equally on the circumference, reactive forces the sun gear 23 receives from the planetary gears 24 are balanced out at a shaft center of the sun gear 23. That is, bending stress is hardly applied to the motor shaft 22. Accordingly, the strength of the motor shaft 22 can be lowered and a size reduction of the motor 15 can be consequently achieved by reducing the diameter of the motor shaft 22.

The carrier 26 that supports the planetary gears 24 in rotatable and revolvable manners has the pinion 27 formed on the side opposite to the side where the planetary gears 24 are supported. Owing to this configuration, the layout of the reducer portion can be smaller and hence the number of components can be reduced.

Because the control board 14 opposes the output shaft 18 and the motor 15, the range switching position detection sensor 37 and the motor position detection sensor 38 can be mounted on the same board. Hence, the configuration can be simpler.

Further, because the control board 14 opposes the stator core 40 of the motor 15, the both ends of the respective phases of the coil 41 can be readily connected directly to the control board 14 by extending the respective ends in the axial direction at positions at which each overlaps the control board 14 in the circumferential direction of the stator core 40. Also, because the neutral point of the star connection is formed of the board pattern 14a, a component forming the neutral point, such as a bus bar, can be omitted. Hence, not only can the device be more compact and flatter, but also the number of components can be reduced.

The control board 14 is installed behind the output shaft 18 and the dust-proof wall 25a provided to the internal gear 25 is located so as to separate the reducer mechanism 16 and the control board 14. Hence, the motor 15 and the reducer mechanism 16 that often undergo sliding motion are hardly affected by abrasion powder depositing on the control board 14 in the course of sliding motion. The motor 15 and the reducer mechanism 16 can therefore become highly reliable.

The magnet generating a field used for a rotation position detection of the motor 15 serves also as the magnet 32 of the rotor 30. The axial dimension of the magnet 32 is greater than the axial dimension of the stator 31 and the magnet 32 is installed so as to protrude toward the motor position detection sensor 38. The stator 31 is therefore unsusceptible to the field being generated. Hence, not only can the rotation position of the rotor 30 be detected correctly, but also the number of components can be reduced.

The carrier 26 having the pinion 27 is supported in a rotatable manner on the motor shaft 22 via the metal bearing 29 provided along the outer periphery of the motor shaft 22 extending toward the planetary gears 24. Hence, displacement between the rotation axis of the sun gear 23 and the rotation axis of the pinion gear 27 can be lessened. The gears are thus allowed to mesh with each other in a stable manner.

It should be appreciated that the invention is not limited to the embodiment described above and can be modified and omitted appropriately without departing from the scope and sprit of the invention.

The range switching device of the invention is not limited to a shift range switching mechanism for vehicle, and can be used also as a drive portion of a valve device for vehicle and a drive portion of an industrial robot and a machine tool.

Various modifications and alterations of this invention will be apparent to those skilled in the art without departing from the scope and spirit of this invention, and it should be understood that this is not limited to the illustrative embodiments set forth herein.

What is claimed is:

1. A range switching device, comprising:
a range switching portion having an output shaft supported in a rotatable manner inside a housing formed of a front body and a rear body and switchable to a plurality of ranges corresponding to turning positions of the output shaft;
a motor attached inside the housing, a motor shaft of which is spaced apart from a shaft center of the output shaft;
a reducer mechanism linked to the motor and the output shaft; and
a control board (14) attached inside the housing and equipped with an electrical control unit which controls rotation of the motor;
wherein:
the reducer mechanism has,
a planetary gear reducer mechanism formed of a sun gear coupled to the motor shaft, a plurality of planetary gears meshed with the sun gear and installed equally on a circumference, an internal gear meshed with the planetary gears, and a carrier supporting the planetary gears in rotatable and revolvable manners, and
a spur gear reducer mechanism formed of a pinion coupled to the carrier on an opposite side to the planetary gears and a main gear fixed to the output shaft of the range switching portion and linked to the pinion; and
the control board is installed oppositely to the output shaft and the motor.

2. The range switching device according to claim 1, wherein:
the control board is provided with a range switching position detection sensor that detects a rotation position of the output shaft.

3. The range switching device according to claim 2, wherein:
the control board is provided with a motor position detection sensor that detects a rotation position of the motor.

4. The range switching device according to claim 3, further comprising:
a magnet embedded in a rotor of the motor; and
an axial dimension of the magnet is greater than an axial dimension of a stator of the motor and the magnet is installed so as to protrude toward the motor position detection sensor oppositely to the motor position detection sensor.

5. The range switching device according to claim 4, wherein:
both ends of a respective U-phase, V-phase, and W-phase coils wound around a stator of the motor are directly connected to the control board.

6. The range switching device according to claim 1, further comprising:
a partition wall formed by extending one end of the internal gear in the reducer mechanism toward the output shaft of the range switching portion so as to separate the control board and the reducer mechanism.

7. The range switching device according to claim 1, wherein:
the pinion forming the spur gear reducer mechanism is supported on the motor shaft via a metal bearing installed along an outer periphery of the motor shaft extending toward the reducer mechanism in such a manner that the pinion is allowed to rotate while coming into sliding contact with the motor shaft.

* * * * *